United States Patent
Bulakci et al.

(10) Patent No.: US 10,849,055 B2
(45) Date of Patent: Nov. 24, 2020

(54) RADIO ACCESS NETWORK CONTROL UNIT AND DYNAMIC SMALL CELL

(71) Applicant: Huawei Technologies Duesseldorf GmbH, Duesseldorf (DE)

(72) Inventors: Ömer Bulakci, Munich (DE); Emmanouil Pateromichelakis, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/507,653

(22) Filed: Jul. 10, 2019

(65) Prior Publication Data
US 2019/0335388 A1 Oct. 31, 2019

Related U.S. Application Data

(63) Continuation of application No. PCT/EP2017/050500, filed on Jan. 11, 2017.

(51) Int. Cl.
*H04W 24/10* (2009.01)
*H04W 28/24* (2009.01)
(Continued)

(52) U.S. Cl.
CPC ........... *H04W 48/16* (2013.01); *H04W 16/16* (2013.01); *H04W 24/10* (2013.01); *H04W 84/045* (2013.01)

(58) Field of Classification Search
CPC ..... H04W 16/06; H04W 16/10; H04W 24/10; H04W 76/00; H04W 72/12; H04W 48/06; H04W 28/24
(Continued)

(56) References Cited

U.S. PATENT DOCUMENTS

| 7,620,370 | B2 * | 11/2009 | Barak | H04W 16/10 370/480 |
| 7,948,936 | B2 * | 5/2011 | Lohr | H04L 47/2408 370/329 |

(Continued)

FOREIGN PATENT DOCUMENTS

| WO | 2007040453 A2 | 4/2007 |
| WO | 2008029411 A2 | 3/2008 |

OTHER PUBLICATIONS

"Radio Resource Management for Network Slicing," 3GPP TSG-RAN WG2 NR Ad Hoc, Spokane, Washington, R2-1700101, pp. 1-4, 3rd Generation Partnership Project, Valbonne, France (Jan. 17-19, 2017).
(Continued)

*Primary Examiner* — William D Cumming
(74) *Attorney, Agent, or Firm* — Leydig, Voit & Mayer, Ltd.

(57) ABSTRACT

The disclosure relates to a radio access network (RAN) control unit for determining a functional operation of a dynamic small cell, in particular an unplanned small cell, a nomadic node or a relay, in a radio communication network comprising at least one slice associated with at least one user equipment and at least one radio channel connecting the at least one user equipment (UE) to the radio communication network, the RAN control unit comprising a processor configured to determine a functional operation of the dynamic small cell (DSC) based on information based on channel measurements of the at least one radio channel and/or requirement information of the at least one slice, and/or estimated or measured performance of the RAN, and/or location information of the DSC.

16 Claims, 10 Drawing Sheets

(51) Int. Cl.
*H04W 16/06* (2009.01)
*H04W 48/16* (2009.01)
*H04W 16/16* (2009.01)
*H04W 84/04* (2009.01)

(58) Field of Classification Search
USPC ........ 455/444; 370/480, 338, 331, 389, 252, 370/329
See application file for complete search history.

(56) References Cited

U.S. PATENT DOCUMENTS

| | | | | |
|---|---|---|---|---|
| 8,345,678 | B2* | 1/2013 | Cheng | H04L 45/302 370/389 |
| 8,848,664 | B2* | 9/2014 | Cheng | H04L 45/302 370/331 |
| 9,276,810 | B2* | 3/2016 | Bi | H04B 7/024 |
| 9,763,226 | B2* | 9/2017 | Wu | H04W 28/24 |
| 9,838,089 | B2* | 12/2017 | Bi | H04L 41/0816 |
| 9,871,736 | B2* | 1/2018 | Bi | H04B 7/024 |
| 9,980,147 | B2* | 5/2018 | Luo | H04W 16/06 |
| 10,485,005 | B2* | 11/2019 | Pao | H04L 1/1825 |
| 10,554,693 | B2* | 2/2020 | Miao | H04L 63/20 |
| 2008/0090575 | A1* | 4/2008 | Barak | H04W 16/10 455/444 |
| 2008/0186925 | A1* | 8/2008 | Cheng | H04L 45/302 370/338 |
| 2012/0033640 | A1* | 2/2012 | Cheng | H04L 45/302 370/331 |
| 2013/0114446 | A1* | 5/2013 | Liu | H04W 24/10 370/252 |
| 2013/0150022 | A1 | 6/2013 | Lee et al. | |
| 2013/0281076 | A1 | 10/2013 | Damnjanovic et al. | |
| 2015/0173011 | A1 | 6/2015 | Das et al. | |
| 2016/0117490 | A1* | 4/2016 | Daly | G06F 21/45 726/19 |
| 2016/0255514 | A1 | 9/2016 | Kim et al. | |
| 2018/0035438 | A1* | 2/2018 | Pao | H04L 5/0053 |
| 2019/0335388 | A1* | 10/2019 | Bulakci | H04W 16/16 |
| 2020/0053592 | A1* | 2/2020 | Turtinen | H04W 76/38 |
| 2020/0112907 | A1* | 4/2020 | Dao | H04W 80/10 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0, 3rd Generation Partnership Project, Valbonne, France (Mar. 2016).

"3rd Generation Partnership Project; Technical Specification Group Radio Access Network; Study on New Radio Access Technology; Radio Access Architecture and Interfaces (Release 14)," 3GPP TR 38.801 V1.0.0, pp. 1-72, 3rd Generation Partnership Project, Valbonne, France (Dec. 2016).

Bulakci et al., "Towards Flexible Network Deployment in 5G: Nomadic Node Enhancement to Heterogeneous Networks," 2015 IEEE International Conference on Communication Workshop (ICCW), London, UK, pp. 1-6, Institute of Electrical and Electronics Engineers, New York, New York (Jun. 8-12, 2015).

"5G White Paper Version: 1.0," NGMN 5g Initiative, pp. 1-125, Next Generation Mobile Networks Alliance, Frankfurt, Germany (Feb. 2015).

Vahid et al., "Small Cells for 5G Mobile Networks," Fundamentals of 5G Mobile Networks. Chapter 3, pp. 63-104, John Wiley and Sons Ltd., Chichester, UK (2015).

* cited by examiner

RADIO ACCESS NETWORK CONTROL UNIT AND DYNAMIC SMALL CELL

CROSS-REFERENCE TO RELATED APPLICATIONS

This application is a continuation of International Application No. PCT/EP2017/050500, filed on Jan. 11, 2017, the disclosure of which is incorporated by reference herein in its entirety.

TECHNICAL FIELD

The present disclosure relates to a dynamic small cell (DSC), in particular an unplanned small cell, a nomadic node or a relay and a Radio Access Network (RAN) Control Unit for determining a functional operation of such a DSC in a slice-based radio communication network, in particular a 5G mobile network. In particular, the present disclosure relates to a method and a system to enable network slice awareness for dynamic small cell operation (e.g. unplanned small cells, vehicular relays, vehicular nomadic nodes, small cells with self-backhauling) in heterogeneous networks.

BACKGROUND

Small Cells are low-power nodes whose transmit (Tx) power is typically lower than macro node and can take the form of Planned/Unplanned pico-cells, femto-cells and relays. Relaying is standardized in LTE (Long Term Evolution) Release 10 and is also part of the fifth generation (5G) new radio (NR) Standardization 3GPP TR 38.801: "Study on new RAT; Radio Access Architecture and Interfaces (Release 14)". Besides, relaying can, as well, be considered as part of unplanned small cell deployment. A Relay or Small Cell can be typically deployed as fixed radio frequency (RF) amplify & forward (AF)/repeater or layer 3 (L3) decode & forward-(DF) according to 3GPP TS 36.300: "Evolved Universal Terrestrial Radio Access (E-UTRA) and Evolved Universal Terrestrial Radio Access Network (E-UTRAN); Overall description; Stage 2, v. 13.3.0, April 2016". In this context, the functional split of small cell networks is fixed and does not change relative to service requirements or the location of the small cell. That is, the functional operation and the associated operation mode of the small cells based on the pre-determined functional split remain fixed. This can also incur higher operational expenditure (OPEX), when the network is planned for the highest or peak service requirements.

One main disadvantage of fixed small cells is the aforementioned lack of flexibility which would be essential in 5G systems, where slice-awareness and 5G tight key performance indicators (KPIs) can necessitate on-demand flexible small cell operation.

More specifically, when user equipments (UEs) with new slices enter the coverage of a fixed small cell, the fixed functional operation can be suboptimal. Furthermore, fixed functional operation and fixed small cell cannot flexibly adapt to changing service (and traffic) requirements.

SUMMARY

It is an object of the disclosure to provide a concept for a mobile communication network, in particular a 5G mobile network with dynamic small cells that are able to dynamically adapt to changing service and traffic requirements.

This object is achieved by the features of the independent claims. Further implementation forms are apparent from the dependent claims, the description and the figures.

A basic concept of the disclosure is to introduce a new RAN control unit imposing a new method, a dynamic small cell performing this method, and a system that comprises these entities and the method. In particular, a RAN Control Unit determines dynamic small cell (DSC) operation and configures DSC based on information comprising channel measurements (direct link between a UE and a base station (BS), and backhaul link between DSC and BS), DSC availability, traffic load, and slice requirements or a subset of these information elements. The RAN Control Unit communicates information elements (signaling) to DSCs with the requested functional operation per slice (e.g., AF, DF L2/L3). The RAN Control Unit communicates with DSCs and exchanges different signaling based on the functional operation. For example, in case of AF DSC, the RAN Control Unit determines Signal Amplification Factor; in case of DF DSC, the RAN Control Unit determines Slice-aware HARQ Operating Point. A DSC performs the above actions and the determined functional operation. The system comprises one or more RAN Control Unit(s) and one or more DSC(s).

The devices, system and methods according to the disclosure provide a solution to the above described problem by configuring functional operation for Dynamic Small Cells to meet slice-specific key performance indicators (KPIs) and subsequently configuring operation mode for Dynamic Small Cells based on, e.g., their positions and backhaul link qualities as described hereinafter.

The devices described herein may be implemented in wireless communication networks, in particular communication networks based on mobile communication standards such as LTE, in particular LTE-A and/or OFDM-based system and 5G. The devices described herein may further be implemented in a mobile device (or mobile station or User Equipment (UE)), for example in the scenario of device-to-device (D2D) communication where one mobile device communicates with another mobile device. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

D2D communications in cellular networks is defined as direct communication between two mobile devices or mobile users without traversing the Base Station (BS) or eNodeB or the core network. D2D communications is generally non-transparent to the cellular network and can occur on the cellular spectrum (i.e., inband) or unlicensed spectrum (i.e., outband). D2D communications can highly increase spectral efficiency, improve throughput, energy efficiency, delay, and fairness of the network. The transmission and reception devices described herein may be implemented in mobile devices communicating under D2D scenarios. However, the transmission and reception devices described herein may also be implemented in a base station (BS) or eNodeB.

The devices described herein may be configured to transmit and/or receive radio signals. Radio signals may be or may include radio frequency signals radiated by a radio transmitting device (or radio transmitter or sender) with a radio frequency lying in a range of about 3 kHz to 300 GHz.

The frequency range may correspond to frequencies of alternating current electrical signals used to produce and detect radio waves.

The devices described herein may be designed in accordance to mobile communication standards such as the Long Term Evolution (LTE) standard or the advanced version LTE-A thereof and the 5G standard which is currently being developed. LTE (Long Term Evolution), marketed as 4G and 4.5G LTE and beyond, is a standard, e.g., for wireless communication of high-speed data for mobile phones and data terminals.

The devices described herein may be applied in OFDM systems and variants of OFDM, e.g., filtered OFDM (F-OFDM). OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The devices described herein may include small cells and may use network slicing. Small cells and network slicing as described hereinafter are two key enablers of 5G, e.g. as described by Next Generation Mobile Networks (NGMN) Alliance: "5G White Paper", February 2015 and it is very likely that they will be standardized for 5G RAN (radio access network) also known as NR (next radio) in 3GPP. Small-cells can improve coverage and/or capacity, e.g. as highlighted in Next Generation Mobile Networks (NGMN) Alliance: "5G White Paper", February 2015. Furthermore, Network Slicing is a composition of network functions, specific function settings and associated resources and can have different impacts on radio access network (RAN) design. In RAN, various slice-based target KPIs can comprise, e.g., throughput/spectral efficiency for enhanced mobile broadband (eMBB) communications, high reliability and low latency for ultra-reliable and low latency communications (URLLC), and connection density for massive machine-type communications (mMTC). Slices may have different requirements in terms of throughput and latency, which necessitate enabling different operations for different types of traffic to meet certain KPIs. In this disclosure, a mode can be realized by one or more functional operations. For example, DF mode can be realized by a L2 or a L3 functional operation.

Consequently, slice-awareness in 5G RAN can necessitate the employment of slice-aware small cells. In addition, vehicular relays, also known as vehicular nomadic nodes, (as particular case of small cells) can be positioned at different parts of the cells; thus, the optimum functional operation in terms of performance can change based on the location and the associated channel link qualities as well as the resultant performance of the functional operation, e.g., in terms of data rate, capacity and/or coverage enhancement, imposed inter-cell interference, and latency. In particular, different functional operations of small cells can have different end-to-end latencies (e.g., AF relaying typically imposes less latency compared to DF relaying thanks to fewer processing steps of the signals).

On this basis, this disclosure provides devices, methods, control units and systems to enable slicing for dynamic small cell operation. Dynamic small cells can take the form of unplanned small cells (see Vahid, S., Tafazolli, R. and Filo, M. (2015): Small Cells for 5G Mobile Networks, in Fundamentals of 5G Mobile Networks (ed J. Rodriguez), John Wiley & Sons, Ltd, Chichester, UK) and vehicular relays also known as vehicular nomadic nodes (see Ö. Bulakci, et. Al: "Towards Flexible Network Deployment in 5G: Nomadic Node Enhancement to Het Net", 12 Jun. 2015). Dynamic Small Cells with adaptive operation modes as described hereinafter can lower also the cost (OPEX of small cells) since the employment of different modes can be on demand and not fixed.

In this disclosure, the functional operation of dynamic small cell is determined based on, e.g., Slice Requirements; Resultant Performance of Functional Split (e.g., throughput and latency); Location of Small Cells in the Service Region (e.g., cell edge and cell center, a determined region, and a set of coordinates).

The utilization of slice-adaptive small cells can show significant gains, since the determined functional operation is based on the slice requirements, and network can adapt to changing traffic and service requirements.

In order to describe the disclosure in detail, the following terms, abbreviations and notations will be used:

DSC: Dynamic Small Cell
RAN: Radio Access Network
NR: New Radio
AF: Amplify and Forward
DF: Decode and Forward
E-UTRA: Evolved Universal Terrestrial Radio Access
E-UTRAN: Evolved Universal Terrestrial Radio Access Network
KPI: Key Performance Indicator
HARQ: Hybrid Automatic Repeat Request
D2D: Device-to-device
OFDM: Orthogonal Frequency Division Multiplex
DL: Downlink
UL: Uplink
BS: Base Station, eNodeB, eNB, gNB
UE: User Equipment, e.g. a mobile device or a machine-type communication device
4G: 4th generation according to 3GPP standardization
5G: 5th generation according to 3GPP standardization
LTE: Long Term Evolution
RF: Radio Frequency
MBB: Mobile BroadBand
eMBB: enhanced Mobile BroadBand
URLLC: Ultra-Reliable Low Latency Communications
ACK: Acknowledgement
TTI: Transmission Time Interval
MTC: Machine Type Communication
mMTC: Massive Machine Type Communications
TX: Transmit
RX: Receive
RAT: Radio Access Technology
OPEX: Operational Expenditures
PHY: physical (layer)
MAC: medium access control (layer)
RLC: radio link control (layer)
PDCP: packet data convergence protocol (layer)
RRC: radio resource control (layer)

According to a first aspect, the disclosure relates to a radio access network (RAN) control unit for determining a functional operation of a dynamic small cell (DSC), in particular an unplanned small cell, a nomadic node or a relay, in a radio communication network comprising at least one slice associated with at least one user equipment (UE) and at least one radio channel connecting the at least one UE to the radio communication network, the RAN control unit comprising: a processor configured to determine a functional operation of the DSC based on information based on channel measurements of the at least one radio channel and/or requirement information of the at least one slice, and/or estimated or measured performance of the RAN, and/or location information of the DSC. I.e., a subset of the above indexed information elements can be used by the processor to determine the functional operation of the DSC.

Note that performance of the functional split can include a trade-off between performance and functional operation, e.g. estimated trade-off between reliability, latency, and data rate. Thus, when performance is described hereinafter, this also refers to trade-off.

Applying such a RAN control unit can lower the cost (OPEX of small cells and/or network) since the employment of different modes can be on demand and not fixed. The functional operation of dynamic small cell can be flexibly determined based on, e.g., Slice Requirements, resultant performance of functional split (e.g., throughput and latency) and location of small cells in the service region (e.g., cell edge and cell center, a determined region, and a set of coordinates). The utilization of such a RAN control unit for controlling slice-adaptive small cells can show significant gains, since the determined functional operation is based on the slice requirements, and network can adapt to changing traffic and service requirements.

In a first possible implementation form of the RAN control unit according to the first aspect, the processor is configured to determine the functional operation of the DSC based on a selection from a set of predefined functional operations and to provide an identifier of the selected functional operation as result.

This provides the advantage that the RAN control unit can quickly and efficiently determine the functional operation of the DSC as the set of predefined functional operations can for example be performed by a look-up table or another memory tool allowing fast access.

In a second possible implementation form of the RAN control unit according to the first aspect as such or according to the first implementation form of the first aspect, the processor is configured to signal the determined functional operation of the DSC to the DSC.

This provides the advantage that the RAN control unit can efficiently control the DSC when signaling the operation mode, i.e. the functional operation to the DSC.

In a third possible implementation form of the RAN control unit according to the second implementation form of the first aspect, the processor is configured to generate a functional operation selection message for transfer to the DSC, wherein the functional operation selection message comprises at least one of the following information elements: an identifier of the DSC, an identifier of the at least one slice and an identifier of the determined operation mode of the DSC.

This provides the advantage that the RAN control unit can efficiently control a multitude of DSCs by transfer of respective functional operation selection messages.

In a fourth possible implementation form of the RAN control unit according to any of the second or third implementation forms of the first aspect, the processor is configured to generate a configuration signaling message for transfer to the DSC, wherein the configuration signaling message comprises at least one of the following configuration parameters: an identifier of the at least one slice, an amplification factor, a HARQ operating point, a HARQ scheme, QoS parameters.

This provides the advantage that the RAN control unit can efficiently configure a plurality of configuration parameters in a multitude of DSCs by transfer of respective configuration signaling messages.

In a fifth possible implementation form of the RAN control unit according to the fourth implementation form of the first aspect, the configuration parameters comprised in the configuration signaling message depend on the functional operation of the DSC.

This provides the advantage that the RAN control unit can flexibly adjust the DSC by applying suitable configuration parameters.

In a sixth possible implementation form of the RAN control unit according to the first aspect as such or according to any of the preceding implementation forms of the first aspect, the channel measurements comprise at least one of: channel measurements of a direct link connecting the at least one UE to a macro base station (BS) of the radio communication network, channel measurements of an access link connecting the at least one UE to the DSC, channel measurements of a backhaul link between the macro BS and the DSC.

This provides the advantage that the RAN control unit can flexibly select the functional operation of the DSC based on a variety of communication links. If one communication link fails, the RAN control unit can adjust the functional operation based on another communication link.

In a seventh possible implementation form of the RAN control unit according to the sixth implementation form of the first aspect, the processor is configured to determine the functional operation of the DSC based on a comparison of the channel measurements of the direct link, the access link and the backhaul link.

This provides the advantage that the RAN control unit can flexibly select the best or optimal communication link which has the highest quality channel.

In an eighth possible implementation form of the RAN control unit according to the seventh implementation form of the first aspect, the processor is configured to compare the channel measurements of the direct link, the access link and the backhaul link based on their channel quality, in particular based on their signal-to-interface-plus-noise ratio (SINR), reference signal receive power (RSRP) or reference signal received quality (RSRQ).

This provides the advantage that the RAN control unit can select the best or optimal communication link by using simple quality measurements such as SINR, RSRP or RSRQ.

In a ninth possible implementation form of the RAN control unit according to the first aspect as such or according to any of the preceding implementation forms of the first aspect, the functional operation of the DSC comprises at least one of: Layer 1 (L1) functional capabilities, Layer 2 (L2) functional capabilities, Layer 3 (L3) functional capabilities, Amplify and Forward (AF) operation mode, Decode and Forward (DF) operation mode.

This provides the advantage that the RAN control unit can flexibly select different functional operations of the DSC, e.g. based on the per-slice requirements, the backhaul channel (between macro and small cell) and the RAN conditions. In the L3 DSC with full functionality, the L3 DSC can control the cell under its coverage, e.g., radio resource management. In case of L2 DSC there can be 2 possible different functional splits (PDCP/RLC split and RLC/MAC split). The PDCP/RLC split can be more applicable in cases of frequent fast handovers (e.g. high mobility users) between the macro and small cells. On the other hand, RLC/MAC split can be more applicable to cases with better backhaul conditions (e.g., ideal backhaul) and cases where the RLC buffering needs to be centrally performed. The L1 DSC can be applied in scenarios where good backhaul and very low latency requirements are available.

In a tenth possible implementation form of the RAN control unit according to the ninth implementation form of the first aspect, the RAN control unit comprises a functionality residing at a macro BS of the radio communication network in case of L1 functional operation, L2 functional operation and/or AF mode; and comprises a self-organizing network (SON) functionality residing at a network manager of the radio communication network in case of L3 functional operation and/or DF mode.

This provides the advantage that in this case, the DSC may have its own cell, e.g., with a physical cell ID (PCI) and the configuration of the functional operation may take place at a slow time scale.

In an eleventh possible implementation form of the RAN control unit according to the first aspect as such or according to any of the preceding implementation forms of the first aspect, the processor is configured to determine a functional operation of a second DSC based on information based on the channel measurements of the at least one radio channel, and/or the requirement information of the at least one slice and/or estimated or measured performance of the RAN, and/or location information of the second DSC.

This provides the advantage that the RAN control unit can flexibly control multiple DSCs based on information comprising channel measurements, slice requirement, estimated or measured performance of the RAN, and a respective location of the different DSCs. Note that requirement information of a slice may also include quality information.

In a twelfth possible implementation form of the RAN control unit according to the first aspect as such or according to any of the preceding implementation forms of the first aspect, the functional operation of the DSC is associated with a first component carrier and/or a second component carrier on which the DSC operates.

This provides the advantage that the RAN control unit can be applied with carrier aggregation increasing the available frequency bandwidth, data throughput, and/or reliability.

In a thirteenth possible implementation form of the RAN control unit according to the first aspect as such or according to any of the preceding implementation forms of the first aspect, the processor is configured to determine the functional operation of the DSC additionally based on functional operations of at least one other DSC.

This provides the advantage that a group of DSCs can be considered for determining the functional operation. This can increase the accuracy of determining the functional operation.

According to a second aspect, the disclosure relates to a dynamic small cell (DSC), in particular an unplanned small cell, a nomadic node or a relay, located in a radio communication network comprising at least one slice associated with at least one user equipment (UE) and at least one radio channel connecting the at least one UE to the radio communication network, the DSC comprising: a processor configured to adapt a functional operation of the DSC, wherein the functional operation of the DSC is adapted based on information based on channel measurements (902) of the at least one radio channel and/or requirement information of the at least one slice, and/or estimated or measured performance of a radio access network (RAN), and/or location information of the DSC; or based on received information of the functional operation of the DSC from a radio access network (RAN) control unit, in particular a RAN control unit according to the first aspect as such or any of the implementation forms of the first aspect.

Applying such an adaptive DSC can lower the cost (OPEX of small cells and/or network) since the employment of different modes can be on demand and not fixed. The functional operation of dynamic small cell can be flexibly determined based on, e.g., Slice Requirements, resultant performance of functional split (e.g., throughput and latency) and location of the small cell in the service region (e.g., cell edge and cell center, a determined region, and a set of coordinates). The utilization of such an adaptive dynamic small cell can show significant gains, since the determined functional operation is based on the slice requirements, and network can adapt to changing traffic and service requirements.

In a first possible implementation form of the DSC according to the second aspect, adapting the functional operation of the DSC is additionally based on functional operations of other DSCs.

This provides the advantage that the RAN control unit can provide accurate functional operation when additionally evaluating the functional operations of other DSCs, e.g. neighboring DSCs, where, e.g., the determined functional operations can result in different performances due to, for example, imposed interference.

In a second possible implementation form of the DSC according to the second aspect as such or according to the first implementation form of the second aspect, the processor is configured to send the adapted functional operation of the DSC to network side, in particular to the RAN control unit.

This provides the advantage that the functional operation of the DSC is available at the network side and, e.g., can be used for evaluating the functional operation of other DSCs.

According to a third aspect, the disclosure relates to a user equipment (UE), comprising: a processor configured to determine information based on channel measurements of at least one radio channel to a macro base station and/or a dynamic small cell (DSC), in particular a DSC with a RAN control unit according to the first aspect or any of the implementation forms of the first aspect and/or location information of the UE; and a transmitter configured to transmit the information to the base station.

This provides the advantage that such a UE can efficiently provide information required by the RAN control unit for determining the functional operation of a DSC. Hence, the functional operation of the dynamic small cell can be flexibly determined based on, e.g., Slice Requirements, resultant performance of functional split (e.g., throughput and latency) and location of small cells in the service region (e.g., cell edge and cell center, a determined region, and a set of coordinates). This can provide significant gains and network can adapt to changing traffic and service requirements.

In a first possible implementation form of the UE according to the third aspect, the channel measurements comprise at least one of: channel measurements of a direct link connecting the UE to the macro base station, channel measurements of an access link connecting the UE to the DSC, channel measurements of a backhaul link between the macro base station and the DSC.

This provides the advantage that the UE can transmit these channel measurements to the base station which can select the best or optimal communication link by evaluating these channel measurements.

In a second possible implementation form of the UE according to the third aspect as such or according to the first implementation form of the third aspect, the UE comprises a receiver configured to receive data from a DSC, a BS and/or a RAN control unit which functional operation is adapted according to the second aspect as such or according to any of the implementation forms of the second aspect.

This provides the advantage that the UE has information of which functional operation is adapted at the DSC and can then adapt a corresponding operation mode.

In a third possible implementation form of the UE according to the second implementation form of the third aspect, the UE is operating in a multi-DSC operation mode in which the receiver is configured to receive data from both the DSC and at least one second DSC.

This provides the advantage that the data rate and/or reliability can be increased when using two or more DSCs.

In a fourth possible implementation form of the UE according to the second or the third implementation form of the third aspect, the UE is operating in a multi-component carrier operation mode in which the receiver is configured to receive data from a first component carrier and a second component carrier.

This provides the advantage that the data rate and/or reliability can be increased when using two or more component carriers.

In a fifth possible implementation form of the UE according to the fourth implementation form of the third aspect, the processor is configured to associate the UE with at least two slices, wherein a first slice is configured on the first component carrier and a second slice is configured on the second component carrier.

This provides the advantage that the UE can flexibly adapt to different requirements when associated to two or more network slices.

According to a fourth aspect, the disclosure relates to a communication system, in particular a 5G communication system, comprising: at least one dynamic small cell (DSC), in particular an unplanned small cell, a nomadic node or a relay, according to the second aspect or an implementation form of the second aspect; at least one user equipment (UE) according to the third aspect or an implementation form of the third aspect; and at least one radio access network (RAN) control unit according to the first aspect or an implementation form of the first aspect for determining a functional operation of the at least one DSC.

Applying such a communication system can lower cost and complexity since the employment of different modes can be on demand and not fixed. The functional operation of dynamic small cell can be flexibly determined based on, e.g., Slice Requirements, resultant performance of functional split (e.g., throughput and latency) and location of small cells in the service region (e.g., cell edge and cell center, a determined region, and a set of coordinates). The utilization of such a communication system with a RAN control unit for controlling slice-adaptive small cells can show significant gains, since the determined functional operation is based on the slice requirements, and network can adapt to changing traffic and service requirements.

According to a fifth aspect, the disclosure relates to a method for determining a functional operation of a dynamic small cell (DSC), in particular an unplanned small cell, a nomadic node or a relay, in a radio communication network comprising at least one slice associated with at least one user equipment (UE) and at least one radio channel connecting the at least one UE to the radio communication network, the method comprising: determining a functional operation of the DSC based on channel measurements of the at least one radio channel and/or requirement information of the at least one slice, and/or estimated or measured performance of the RAN, and/or location information of the DSC.

The utilization of such a method can show significant gains and network can adapt to changing traffic and service requirements.

According to a sixth aspect, the disclosure relates to a method, comprising: Determining the functional operation of dynamic small cells, which can take the form of unplanned small cells, nomadic nodes or relays, based on the information comprising location, channel measurements, slice requirements, estimated trade-off between reliability, latency, and data rate.

In a first possible implementation form of the method according to the sixth aspect, the method comprises: Commanding dynamic small cells via new Information Elements (signaling) the determined functional operation.

In a second possible implementation form of the method according to the sixth aspect as such or according to the first implementation form of the sixth aspect, the method comprises: Configuring slice-specific functional operations based on the determined functional operation and slice requirements.

In a third possible implementation form of the method according to the sixth aspect as such or according to the first implementation form of the sixth aspect, the method comprises: Configuring for the direct link, when above conditions are not fulfilled.

In a fourth possible implementation form of the method according to the sixth aspect as such or according to the first implementation form of the sixth aspect, the method comprises Slice-adaptive Functionality to determine Functional Operation of the dynamic small cells.

According to a seventh aspect, the disclosure relates to a device (i.e., dynamic small cell) that performs the method according to the sixth aspect as such or according to any of the implementation forms of the sixth aspect.

According to an eighth aspect, the disclosure relates to a RAN Control Unit that determines the functional operation and comprises the slice-adaptive functionality of the device according to the seventh aspect.

According to a ninth aspect, the disclosure relates to a network or system that includes the device according to the seventh aspect and performs the method according to the sixth aspect as such or according to any of the implementations form of the sixth aspect.

BRIEF DESCRIPTION OF THE DRAWINGS

Further embodiments of the disclosure will be described with respect to the following figures, in which.

DETAILED DESCRIPTION OF THE EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
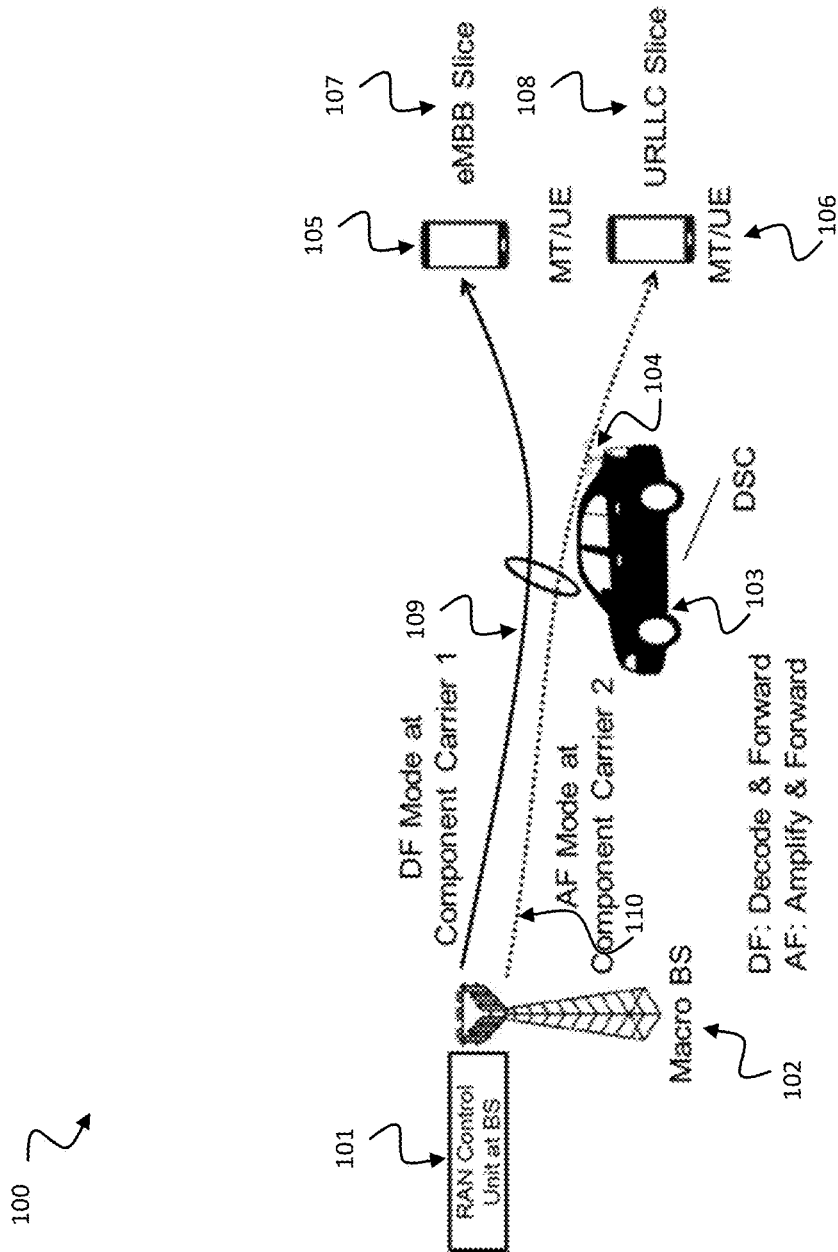
FIG. 1 shows a schematic diagram illustrating a communication system 100 according to the disclosure where a vehicular nomadic node as a DSC serves two different slices with two different modes, which are determined and configured by a RAN control unit exemplarily residing at the macro BS.

FIG. 1 shows a schematic diagram illustrating a communication system 100 according to the disclosure where a vehicular nomadic node, e.g. a car 103 as a DSC 104 serves two different slices 107, 108 with two different modes, which are determined and configured by a RAN control unit 101 exemplarily residing at the macro BS 102.

The considered system 100 is illustrated with an example constellation in FIG. 1. In FIG. 1, a vehicular nomadic node 103 serves two mobile terminals (MTs) 105, 106, also known as user equipments (UEs), where each MT is associated with a different slice 107, 108. The wireless backhaul link 109, 110 is provided by the macro base station (BS) 102 where the RAN control unit 101 exemplarily resides at the macro BS 102. Based on the slice requirements, DF mode is determined and configured by the RAN control unit 101 for the eMBB slice 107 at the component carrier 1, 109 and AF mode is determined and configured by the RAN control unit 101 for the URLLC slice 108 at the component carrier 2, 110. The component carriers 109, 110 may reside at different frequency bands, e.g., component carrier 1 can be a frequency band above 6 GHz and component carrier 2 can be a frequency band below 6 GHz. Further, AF mode can be a repeater where the received total signal is amplified and forwarded and DF mode can be a decode and forward (DF) relaying operation, where the received signal is first decoded, and re-encoded, and then forwarded to the destination. The relaying modes are not limited to AF and DF, where other modes can also be configured, e.g., compress and forward (CF).

Figures 2A, 2B:
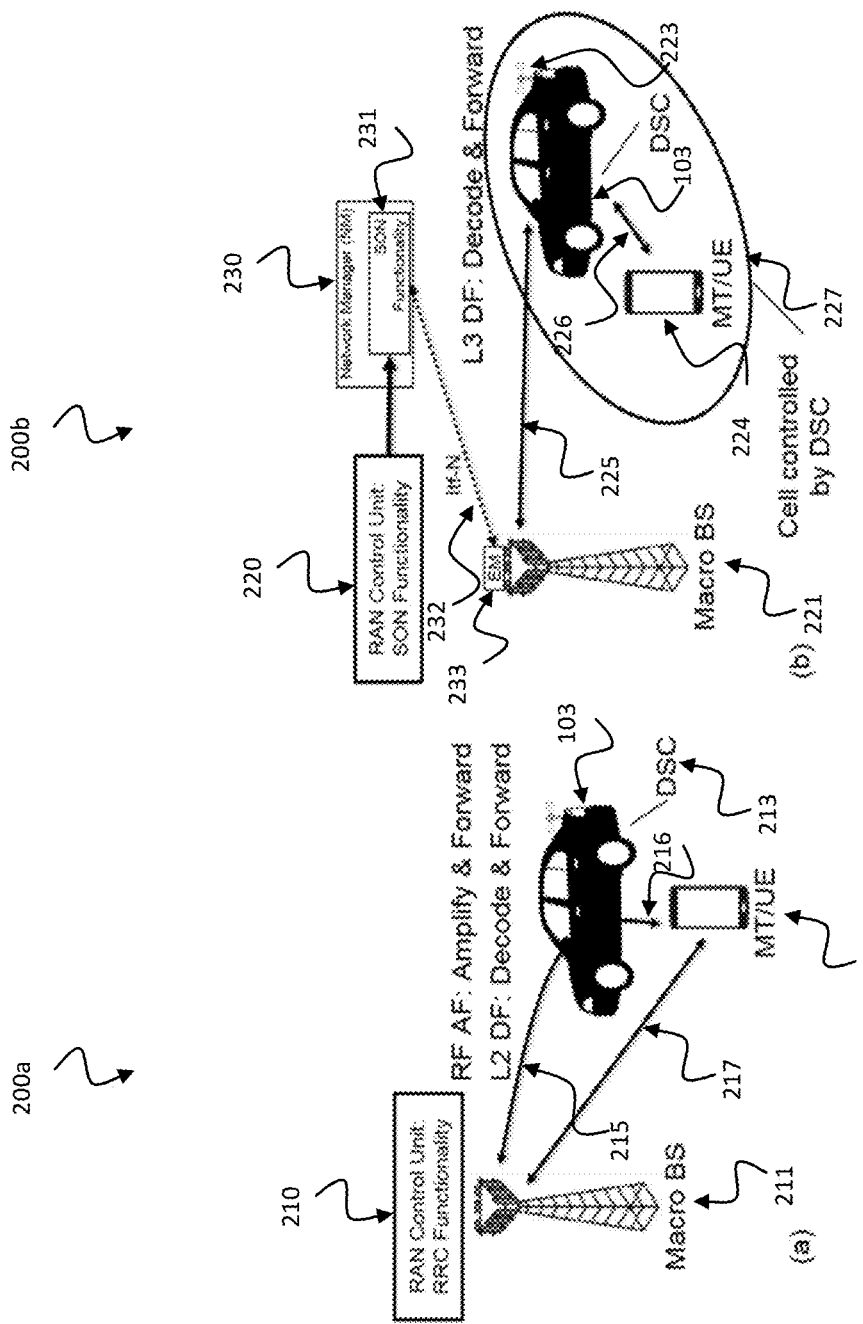
FIGS. 2*a* and 2*b* show schematic diagrams illustrating communication systems 200*a*, 200*b* according to the disclosure with various exemplary placements of the RAN control unit; (a) in case of AF mode and L2 DF mode and (b) in case of L3 DF mode.

FIGS. 2a and 2b show schematic diagrams illustrating communication systems 200a, 200b according to the disclosure with various exemplary placements of the RAN control unit 210, 220; (a) in case of AF mode and L2 DF mode and (b) in case of L3 DF mode.

Depending on the functional operations of the DSCs 213, 223 and how frequently the functional operations are configured by the RAN control unit 210, 220, the RAN control unit 210, 220 may reside at different network elements, as exemplified in FIG. 2. For example, in case of L1 functional operation (e.g., physical layer, PHY), L2 functional operation (e.g., PHY and medium access control, MAC or PHY, MAC, radio link control, RLC, or PHY, MAC, RLC, packet data convergence protocol, PDCP [3GPP TS36.300]), and AF modes, the configuration of the DSCs 213 can be dynamically changed and the RAN control unit 210 can be a functionality that resides at RAN, e.g., at radio resource control (RRC) at the macro BS 211 (as shown in FIG. 2a). In case of L3 functional operation (e.g., PHY, MAC, RLC, PDCP, RRC [3GPP TS36.300]), the DSC 223 may have its own cell, e.g., with a physical cell ID (PCI), and the configuration of the functional operation may take place at a slow time scale. In this case, the RAN control unit 220 may be a self-organizing (SON) functionality 231 that resides at the network manager (NM) 230, e.g., operation administration and maintenance (OAM) (as shown in FIG. 2b). In another implementation, RAN control unit may reside at the RAN, e.g., at RRC, and may communicate with the SON functionality 231 at the NM 230 for configuring L3 DSC functional operation, where part of the configuration parameters (such as, transmit power and tilting angle) may be obtained from this SON functionality 231. The SON functionality 231 may be connected via Itf-N interface 232 to Element Management (EM) system 233 in macro BS 221.

In case of L1, L2 and AF modes (as shown in FIG. 2a), the MT 214 may be connected both to the DSC 213 (via access link 216) and macrocell 211 (via direct link 217), the DSC 213 may be connected (via backhaul link 215) to macrocell 211. In case of L3 and DF modes (as shown in FIG. 2b), the MT 224 may be located in the cell 227 controlled by DSC 223 and the MT 224 may be connected to DSC 223 (via access link 226), the DSC 223 may be connected via backhaul link 225 to macro BS 221.

Figure 3:
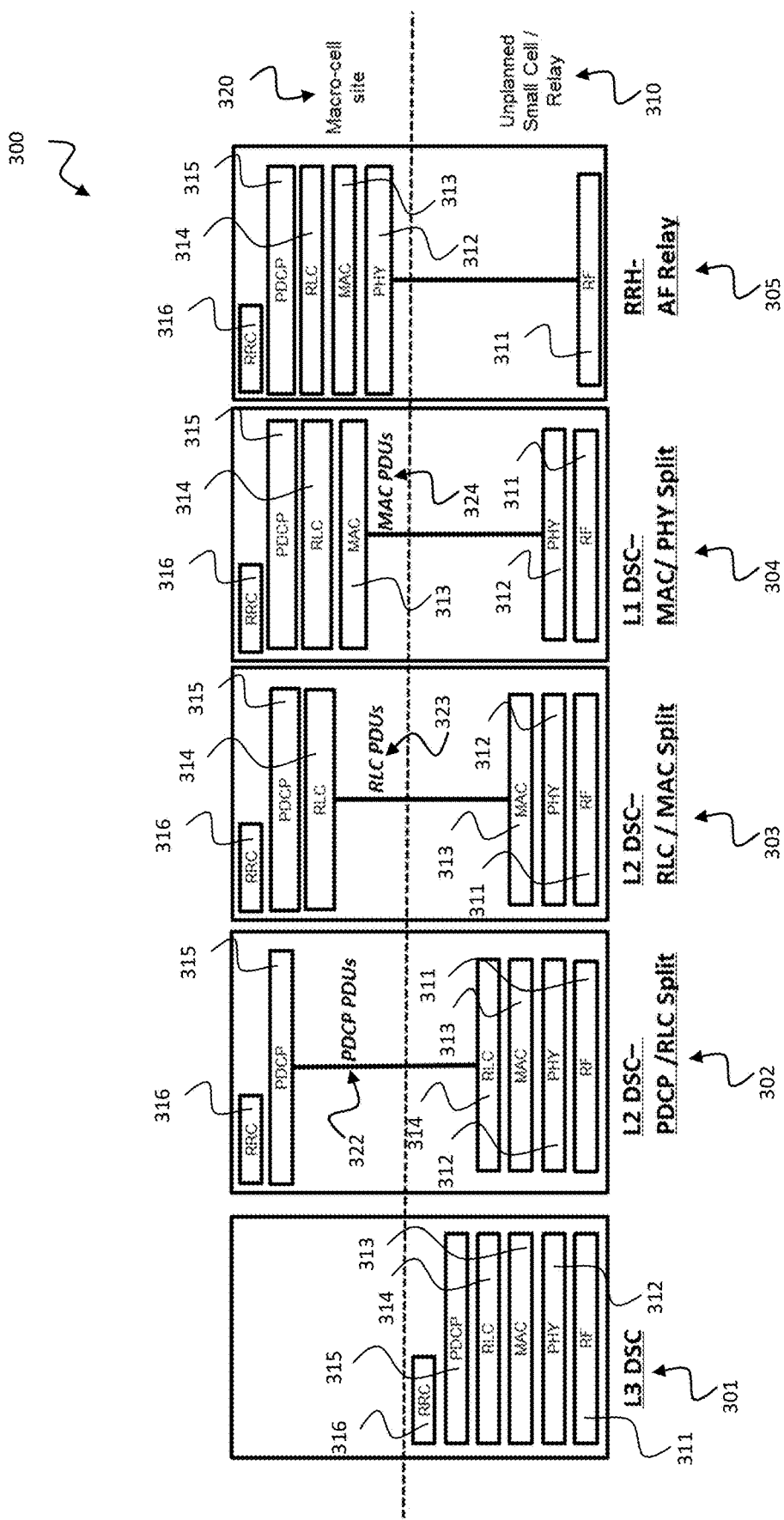
FIG. 3 shows a schematic diagram 300 illustrating various exemplary functional operations/modes and the corresponding functional splits among the macro BS and DSC according to implementation forms.

FIG. 3 shows a schematic diagram 300 illustrating various exemplary functional operations/modes and the corresponding functional splits among the macro BS and DSC according to implementation forms. The different functional operations/modes differ in the location where the protocol stack layers are split between macro-cell site 320 and DSC, e.g. unplanned small cell/relay 310. Different protocol stack layers are implemented: RF (radio frequency) layer 311, PHY (physical) layer 312, MAC (medium access control) layer 313, RLC (radio link control) layer 314, PDCP (packet data convergence protocol) layer 315 and RRC (radio resource control) layer 316.

Different example functional operations (also can be mapped to modes) are depicted in FIG. 3. As mentioned above, different possible functional splits can be identified given the per-slice requirements, the backhaul channel (between macro and small cell) and the RAN conditions. In this context, the first option can be the L3 DSC with full functionality 301, i.e., the L3 DSC can control the cell under its coverage, e.g., with a physical cell ID. In case of L2 DSC, there can be two 2 different possible functional splits 302, 303 (PDCP/RLC split 302 and RLC/MAC split 303). The PDCP/RLC split 302 can be more applicable in cases of frequent fast handovers (e.g. high mobility users) between the macro and small cells, since PDCP re-transmissions would be required more often and PDCP should be centralized for fast traffic forwarding. On the other hand, RLC/MAC split 303 can be more applicable to cases with better backhaul conditions (e.g., ideal backhaul) and cases where the RLC buffering needs to be centrally performed. An exemplary scenario of RLC/MAC split 303 is the case of having large packets (e.g. eMBB traffic) and per segment automatic repeat request (ARQ) is needed at the macro cell to avoid redundant re-transmissions of the entire packets. Another functional split option is the L1 DSC 304 which requires good backhaul and very low latency requirements. In that case, the real-time scheduling would be performed at the macro-cell site and we may have some resource pooling gains (e.g. coordinated multipoint, CoMP, may also be used). Another option is the DSC to act as Radio Remote Head (RRH) 305 which requires fronthaul between the macro and DSC, and can mainly be applicable to centralized/cloud-RAN (C-RAN) physical deployment. These functional operations may not be confined to protocol stack layers, i.e., some of the functionalities at each protocol stack layer may also be split. For example, MAC functionality of hybrid ARQ (HARQ) may be at the DSC, while another MAC functionality multiplexing/de-multiplexing may reside at the macro BS. Furthermore, L1, L2, and L3 functional operations can be refined, re-defined, and modified in new releases of a standard, e.g., LTE or 5G new radio.

Figure 4:
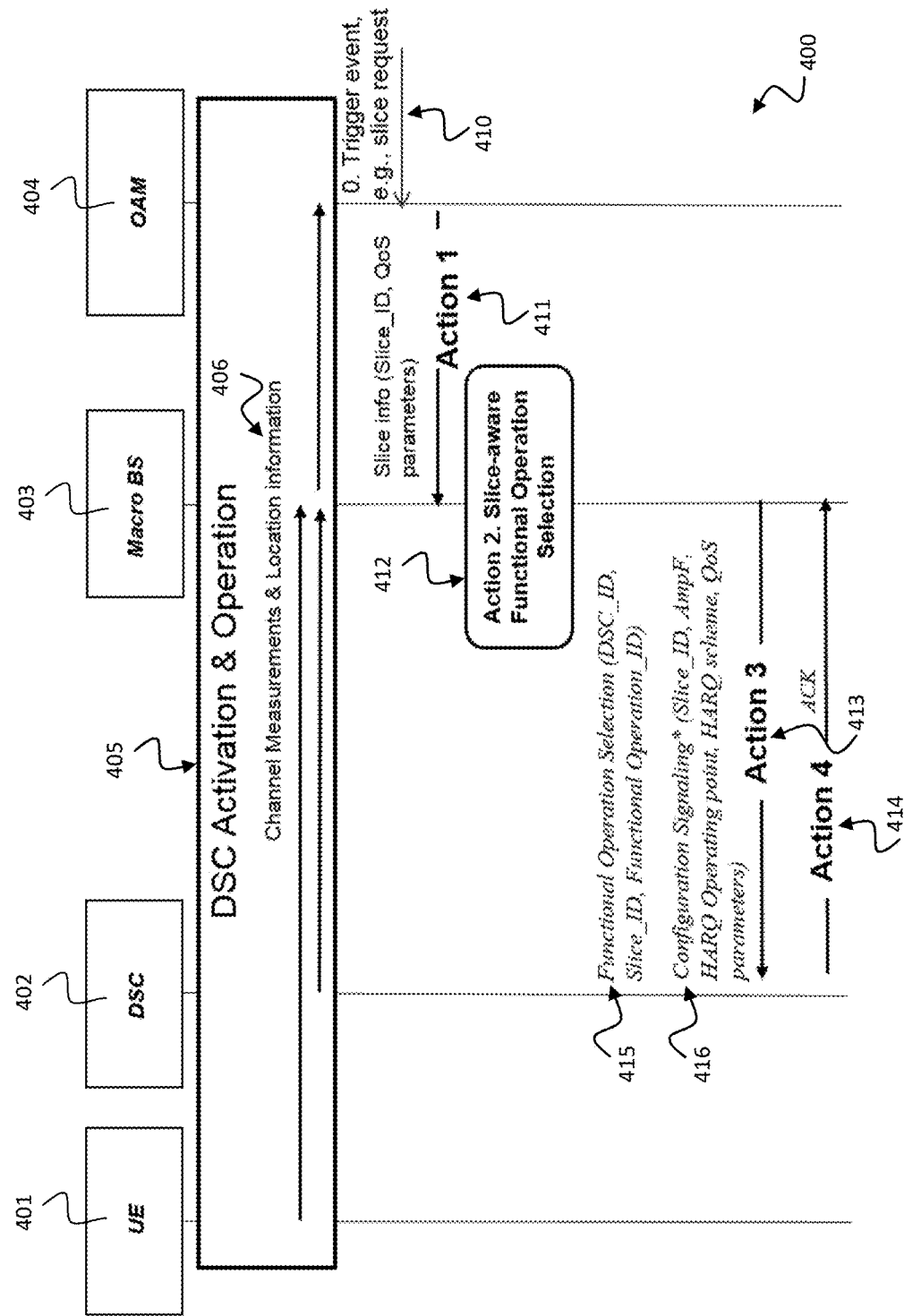
FIG. 4 shows an exemplary Message sequence chart 400 for an exemplary configuration process according to an implementation form.

FIG. 4 shows an exemplary Message sequence chart 400 for an exemplary configuration process according to an implementation form. The blocks UE 401, DSC 402, Macro BS 403, OAM 404 may correspond to the respective units described above with respect to FIGS. 1 to 3. E.g. macro BS 403 may be a macro cell 211, 221, 102 according to FIGS. 1 and 2; DSC 402 may be a small cell 213, 223, 104 according to FIGS. 1 and 2; and UE 401 may be a MT/UE 214, 224, 105, 106 according to FIGS. 1 and 2.

The main process, as exemplified in FIG. 4, comprises at least one of the following 4 actions: Action (0), 410: Trigger event e.g., slice instantiation request at OAM 404. Action (1), 411: Command from OAM 404 to macro BS 403 to notify about the slice QoS parameters. Action (2), 412: Determining the Functional Operation(s) of the DSC 402 based on, such as, the slice requirements, the DSC location and/or channel quality. This can be configured by the RAN control unit at macro BS 403. Action (3), 413: Configuration command sent from Macro 403 to DSC 402. Action (4), 414: Acknowledgement of DSC 402 to macro 403 that configuration set-up is complete.

As can be seen in FIG. 4, Action (3), 413 can include two messages 415, 416 between the Macro-cell 403 site and the DSC 402. Firstly, the message Functional Operation Selection (Macro BS-DSC) 415 includes at least one of the following information elements: DSC_ID, Slice_ID, Functional Operation_ID. Moreover, the message Configuration Signaling (Macro BS-DSC) 416 which may include parameters: Slice_ID, Amplification Factor (AmpF), HARQ Operating point, HARQ scheme, QoS parameters.

Note that, the information elements which are sent in Configuration Signaling message 416 may depend on the functional operation e.g., QoS parameters are sent when the mode is DF. Further, depending on the functional operation new information elements can be added to the above-mentioned messages 415, 416. For example, in case of AF mode, the amplification factor can be sent to the DSC 402.

The channel quality information, such as, on the backhaul link between DSC 402 and macro BS 403, the access link between the DSC 402 and UE(s) 401 can be collected when the DSC 402 is first activated or upon request by the RAN control unit. The functional operation configuration can also depend on the link quality of the UE(s) 401 towards the macro BS 403 and/or DSC 402. For example, it can be determined that for a slice the UE 401 may get the service from the macro BS 403, while for another slice the UE 401 may get the service from the DSC 402.

Figure 5:
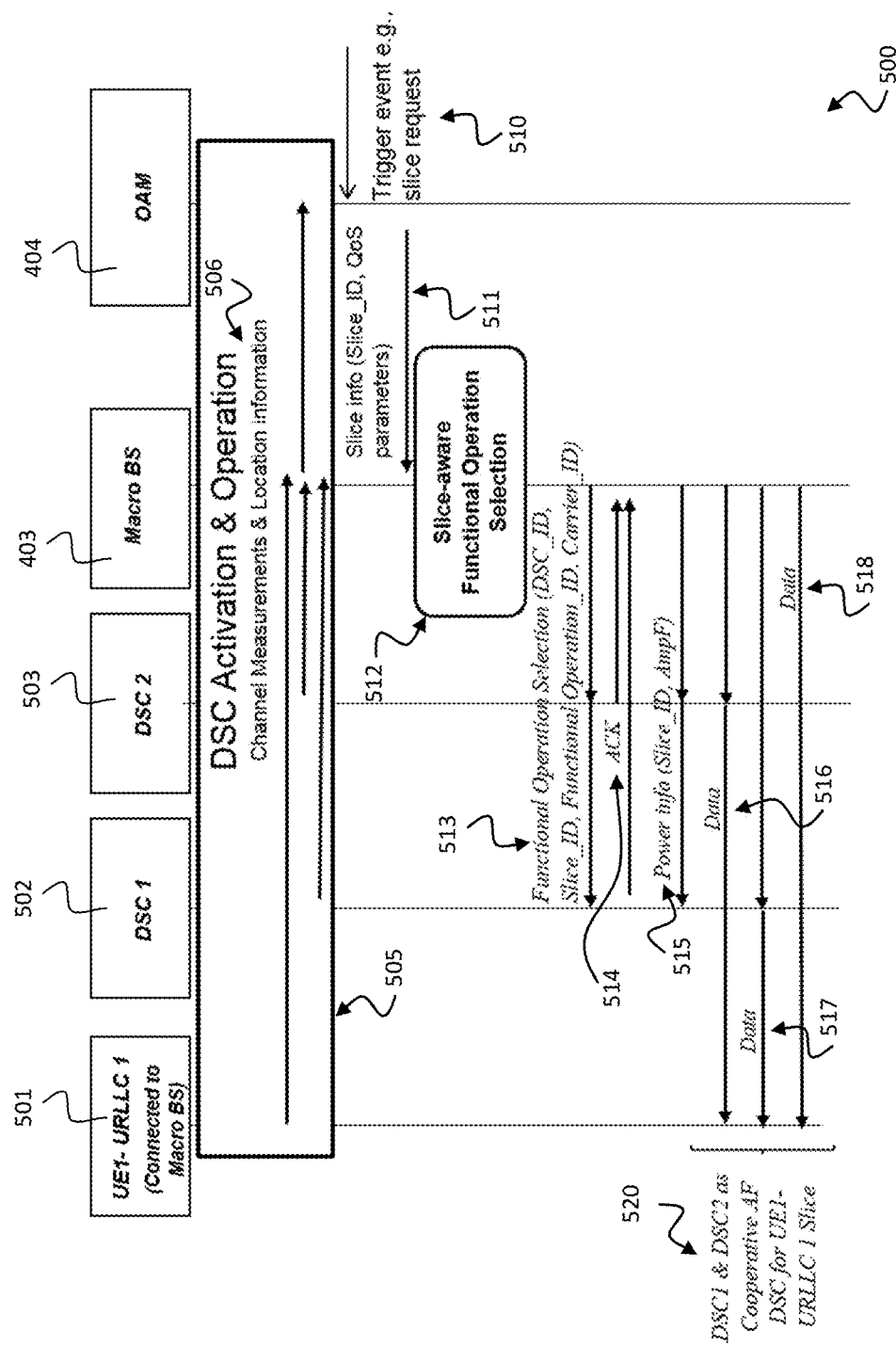
FIG. 5 shows an exemplary Message sequence chart 500 for an exemplary configuration process for multi-DSC operation according to an implementation form.

FIG. 5 shows an exemplary Message sequence chart 500 for an exemplary configuration process for multi-DSC operation according to an implementation form. The blocks UE1 501, DSC1, 502, DSC2, 503, Macro BS 403, OAM 404 may correspond to the respective units described above with respect to FIGS. 1 to 3. E.g. macro BS 403 may be a macro cell 211, 221, 102 according to FIGS. 1 and 2; DSC1 502 and DSC2 503 may be small cells 213, 223, 104 according to FIGS. 1 and 2; and UE1 501 may be a MT/UE 214, 224, 105, 106 according to FIGS. 1 and 2.

The method described above can be applied to multi-DSC operation as exemplified in FIG. 5. In this example, AF mode for two DSCs 502, 503 are configured for UE1, 501, which is associated with URLLC 1 slice. Such a configuration can provide reliable data communications, where the data are received on different paths, i.e., towards DSC1, 502, DSC2, 503 and directly from macro BS 403. Here, as DSC1 and DSC2 are configured as AF mode, they amplify and forward the total signal received including the data from the macro BS 403. In this embodiment, DSC1, 502 and DSC2, 503 can be configured with different amplification factors (AmpFs) and maximum transmit power levels. DSC1, 502 and DSC2, 503 may also operate on different component carriers as determined by the RAN control unit residing at the macro BS 403 in this example implementation.

The main process, as exemplified in FIG. 5, comprises at least one of the following 8 actions: Action (0), 510: Trigger event, e.g., slice instantiation request at OAM 404. Action (1), 511: Command from OAM 404 to macro BS 403 to notify about the slice QoS parameters. Action (2), 512: Determining the Functional Operation(s) of DSC1, 502 and DSC2, 503 based on, such as, the slice requirements, the DSC location and/or channel quality. This can be configured by the RAN control unit at macro BS 403. Action (3), 513: Functional Operation selection command sent from Macro 403 to DSC1, 502 and DSC2, 503. Action (4), 514: Acknowledgement of DSC1, 502 and DSC2, 503 to macro 403 that functional operation selection is complete. Action (5), 515: Power info command sent from Macro 403 to DSC1, 502 and DSC2, 503 with parameters Slice ID and amplification factor AmpF. Action (6), 516: Data from Macro 403 to DSC2, 503 and UE1, 501. Action (7), 517: Data from Macro 403 to DSC1, 502 and UE1, 501. Action (8), 518: Data from Macro 403 to UE1, 501. For the transmission of data, DSC1, 502 and DSC2, 503 are used as cooperative AF DSC for UE1-URLLC 1 Slice.

Figure 6:
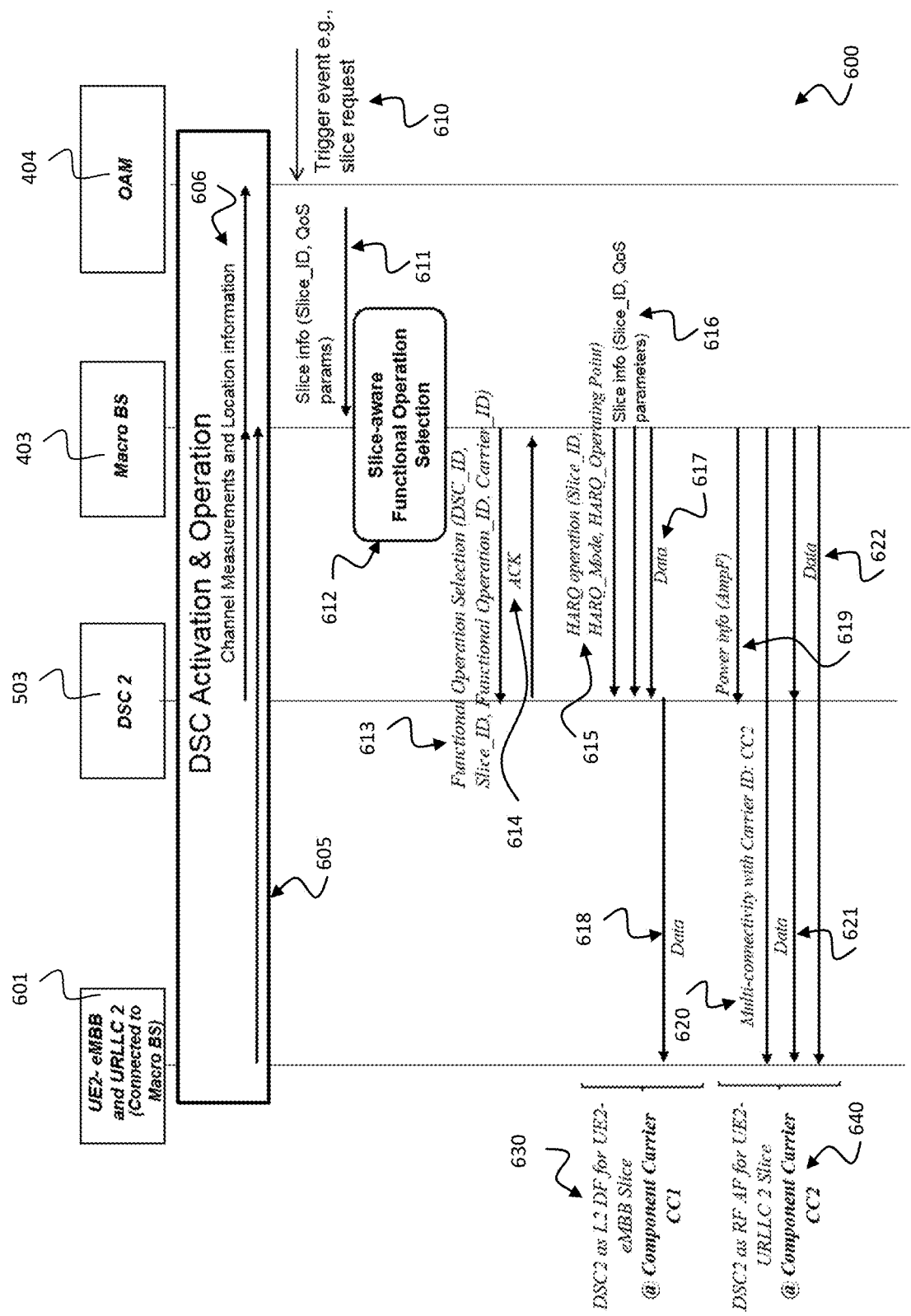
FIG. 6 shows an exemplary Message sequence chart 600 for an exemplary configuration process for multi-component carrier (CC) operation according to an implementation form.

FIG. 6 shows an exemplary Message sequence chart 600 for an exemplary configuration process for multi-component carrier (CC) operation according to an implementation form. The blocks UE2 601, DSC2, 503, Macro BS 403, OAM 404 may correspond to the respective units described above with respect to FIGS. 1 to 3. E.g. macro BS 403 may be a macro cell 211, 221, 102 according to FIGS. 1 and 2; DSC2 503 may be a small cell 213, 223, 104 according to FIGS. 1 and 2; and UE2 601 may be a MT/UE 214, 224, 105, 106 according to FIGS. 1 and 2.

The method described above can be applied to multi-component carrier (CC) operation as exemplified in FIG. 6. In this example, AF mode UE2, 601 is associated with two slices, namely, eMBB and URLLC 2 slices. Here, the DSC2, 503 is configured as the L2 DF functional operation for the eMBB slice on the CC1, 630 and RF AF functional operation on the CC2, 640. Accordingly, the configuration parameters can be different for different CCs and slices. Further, optionally, the UE2, 601 can be informed about the functional operations on each CC.

The main process, as exemplified in FIG. 6, comprises at least one of the following actions: Action (0), 610: Trigger event, e.g., slice instantiation request at OAM 404. Action (1), 611: Command from OAM 404 to macro BS 403 to notify about the slice QoS parameters. Action (2), 612: Determining the Functional Operation(s) of DSC2, 503 based on, such as, the slice requirements, the DSC location and/or channel quality 606. This can be configured by the RAN control unit at macro BS 403. Action (3), 613: Functional Operation selection command sent from Macro 403 to DSC2, 503. Action (4), 614: Acknowledgement of DSC2, 503 to macro 403 that functional operation selection is complete. Action (5), 615: HARQ operation command sent from Macro 403 to DSC2, 503 with parameters Slice ID, HARQ mode and HARQ operating Point. Action (6), 616: Slice Info from Macro 403 to DSC2, 503 with slice ID and QoS parameters. Action (7), 617: Data from Macro 403 to DSC2, 503. Action (8), 618: Data from DSC2, 503 to UE2, 601. Action (9), 619: Power info command sent from Macro 403 to DSC2, 503 with parameter amplification factor AmpF. Action (10), 620: Data from Macro 403 to UE2, 601. Action (11), 621: Data from Macro 403 to DSC2, 503 and UE2, 601. Action (12), 622: Data from Macro 403 to UE2, 601.

Figure 7:
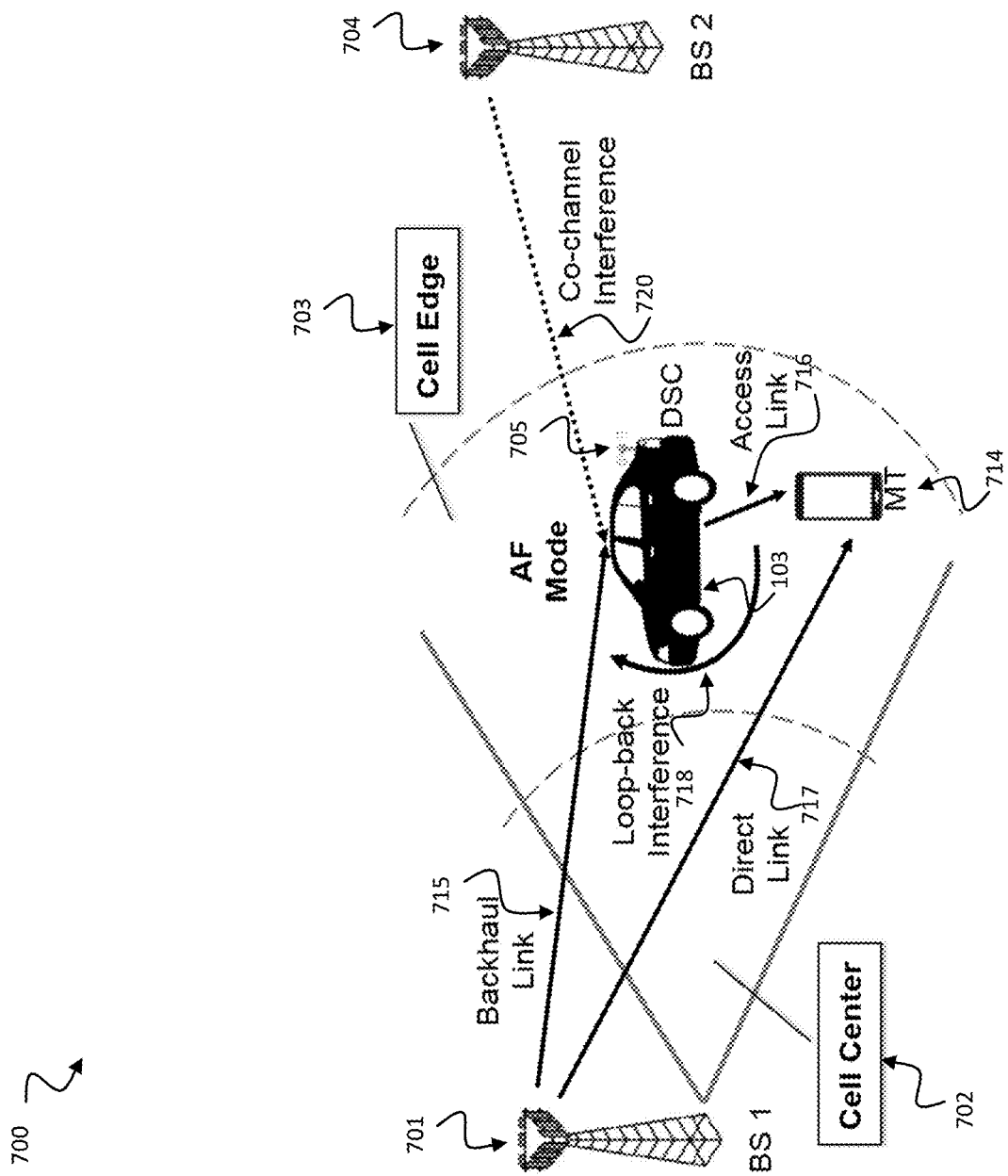
FIG. 7 shows a schematic diagram illustrating a communication system 700 according to the disclosure with an exemplary functional operation configuration based on the location of the DSC according to an implementation form.

FIG. 7 shows a schematic diagram illustrating a communication system 700 according to the disclosure with an exemplary functional operation configuration based on the location of the DSC 705 according to an implementation form. The MT 714 has an access link 716 to the DSC 705 located in the car 103 and a direct link 717 to the macro BS1, 701. A backhaul link 715 is between the DSC 705 and the macro BS1, 701. There is loop-back interference 718 between the MT 714 and the DSC 705. A second base station, macro BS2, 704 is responsible for co-channel interference 720 between the second macro BS2, 704 and the DSC 705.

The method described above can be applied based on the location of the DSC 705. The location of the DSC 705 can influence the performance of the functional operation. For example, when the DSC 705 is close to the cell-edge 703 and is impacted largely by the co-channel interference 720 induced by other BSs 704, the AF mode may be inversely affected by the amplification of the interference 720 in the total signal received on the backhaul link 715 in case of downlink. In such a case, it may be preferred to apply DF mode rather than AF mode, where in case of DF operation the interfering signal 720 is not amplified. In addition, the loop-back interference 718 in AF mode is caused by the full duplex operation in AF mode and can also be taken into account in determining the functional operation. The loop-back interference 718 depends on the separation between the backhaul 715 and access 716 links and can be different for different DSCs 705. Accordingly, the DSC type, e.g., influence by vehicle type, can also be taken into account in determining the functional operation of the DSC 705. The DF mode can be inband half-duplex, where the backhaul 715 and access 716 links can be separated in frequency domain or time domain. In the cell center 702, where the DSC 705 is closer to the serving macro BS 701 or when the interference on the backhaul link 715 is obstructed by some objects, e.g., buildings, the AF mode can have better throughput performance than the DF mode.

On this basis, based on the location of the DSC 705, the functional operation can be determined. In addition to the location information, the channel measurements on different links can be utilized. For example, when direct link 717 channel quality, which can be measured in terms of signal-to-interference-plus-noise ratio (SINR), reference signal received power (RSRP) or reference signal received quality (RSRQ), is higher or comparable to the backhaul link 715 quality, DF half-duplex functional operation may not be preferred, as part of the resources cannot be utilized due to half duplex operation and this would result in worse throughput performance on the end-to-end link via the DSC 705. Yet, the AF mode can still be used, if the co-channel interference 720 is not limiting the expected performance.

In the following, an exemplary implementation of the UE 714 shown in FIG. 7 is described.

Such a UE 714 may include a processor and a transmitter. The processor is configured to determine information based on channel measurements of at least one radio channel to a macro base station 701 and/or a DSC 705, in particular a DSC with a RAN control unit as described above and/or location information of the UE such as a geographic position. The transmitter is configured to transmit the information to the base station 701.

The channel measurements may include channel measurements of a direct link 717 connecting the UE 714 to the macro base station 701, channel measurements of an access link 716 connecting the UE 714 to the DSC 705, and/or channel measurements of a backhaul link 715 between the macro base station 701 and the DSC 705.

The UE 714 may include a receiver configured to receive data from a DSC 705, a BS 701 and/or a RAN control unit which functional operation is adapted as described above or as described below with respect to FIG. 10. The UE 705 may operate in a multi-DSC operation mode, e.g. as described above with respect to FIG. 5, in which the receiver is configured to receive data from both the DSC and at least one second DSC. The UE may also or alternatively operate in a multi-component carrier operation mode, e.g. as described above with respect to FIG. 6, in which the receiver is configured to receive data from a first component carrier and a second component carrier. The processor may be configured to associate the UE 714 with at least two slices, wherein a first slice is configured on the first component carrier and a second slice is configured on the second component carrier.

In one exemplary configuration, the communication system 700 shown in FIG. 7 may be a 5G communication system, including at least one dynamic small cell (DSC), in particular an unplanned small cell, a nomadic node or a relay; at least one user equipment (UE) as described above; and at least one radio access network (RAN) control unit 900, e.g. as described above or below with respect to FIG. 9, for determining a functional operation 908 of the at least one DSC.

Figure 8:
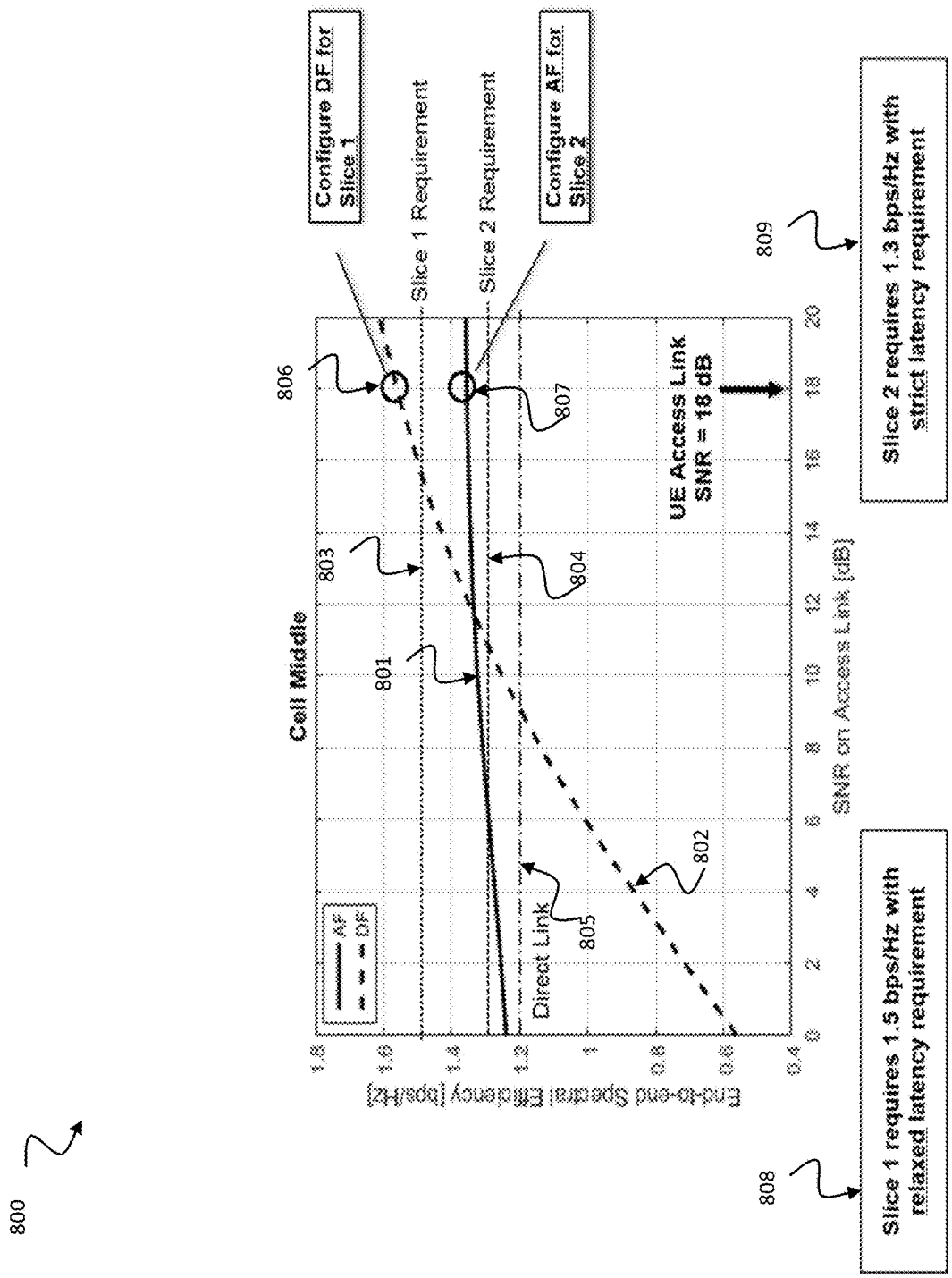
FIG. 8 shows an example performance diagram 800 illustrating an exemplary functional operation configuration based on the performances according to an implementation form.

FIG. 8 shows a performance diagram 800 illustrating an exemplary functional operation configuration based on the performances according to an implementation form.

The figure illustrates an example end-to-end spectral efficiency performance (BS-DSC and DSC-UE link) of DF half-duplex functional operation 802 and AF mode 801 versus the signal to noise ratio (SNR) on the access link. A direct link 805 performance is also exemplified. In this example, two slices with different requirements on the spectral efficiency are depicted. It is to be noted that AF functional operation 801 may induce lower end-to-end latency compared to DF mode 802, because AF mode 801 can include fewer amount of processing functions and does not include a decoding of the signal. Additionally, AF mode 801 is typically full duplex. When the UE access link SNR is 18 dB, as marked in FIG. 8, the slice 2 requirement 804 on the spectral efficiency can already be fulfilled 807 by the AF mode 801. As the AF mode 801 induces shorter latency, and slice 2 has strict latency requirement, for slice 2 AF mode 801 can be configured. On the other hand, slice 1 requirement 803 can only be fulfilled 806 by DF mode 802 and as the slice 1 has relaxed latency requirement, for slice 1 DF mode 802 can be configured.

On this basis, the performance of different functional operations, e.g., in terms of throughput performance, end-to-end latency, and reliability, can be taken into account and based on the slice requirements, the functional operation can accordingly be determined.

Figure 9:
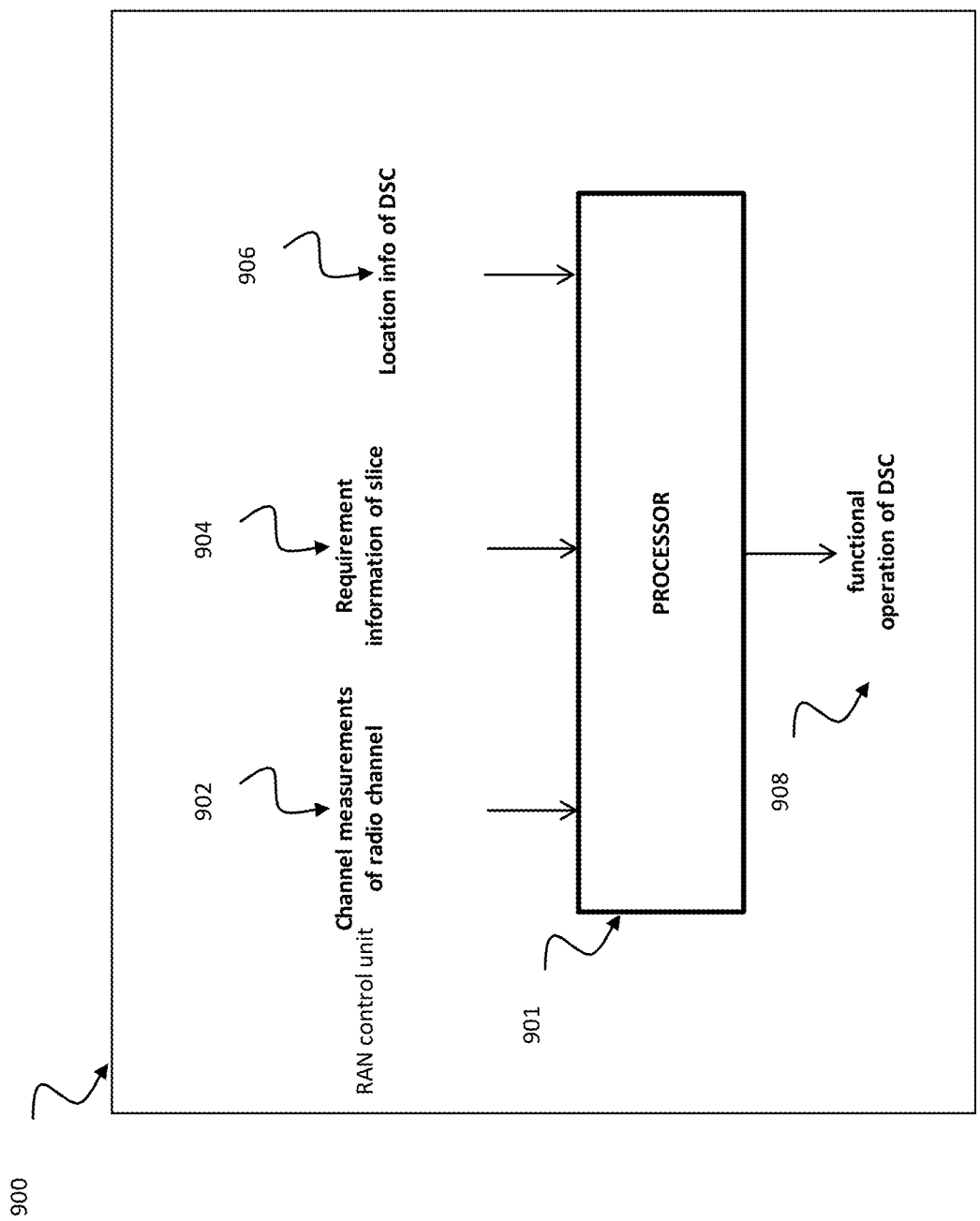
FIG. 9 shows a schematic diagram illustrating a RAN control unit 900 according to an implementation form.

FIG. 9 shows a schematic diagram illustrating a RAN control unit 900 according to an implementation form. The RAN control unit 900 can determine a functional operation 908 of a dynamic small cell (DSC), in particular an unplanned small cell, a nomadic node or a relay, in a radio communication network comprising at least one slice associated with at least one user equipment (UE) and at least one radio channel connecting the at least one UE to the radio communication network. The RAN control unit 900 includes a processor 901 that is configured to determine a functional operation 908 of the DSC based on information based on channel measurements 902 of the at least one radio channel and/or requirement information 904 of the at least one slice, and/or estimated or measured performance of the RAN, and/or location information 906 of the DSC. These information elements described above can be used all for determining the functional operation 908 or alternatively a subset of these information elements can be used, for example determining the functional operation 908 of the DSC (only) based on channel measurements 902.

The processor 901 may determine the functional operation 908 of the DSC based on a selection from a set of predefined functional operations and may provide an identifier of the selected functional operation 908 as result, e.g. a Functional Operation_ID parameter as described above with respect to FIGS. 4, 5 and 6. The processor 901 may signal the determined functional operation 908 of the DSC to the DSC, e.g. by the messages 415, 513, 613 as described above with respect to FIGS. 4, 5 and 6.

The processor 901 may generate a functional operation selection message 415 for transfer to the DSC 402, e.g. as described above with respect to FIG. 4. The functional operation selection message 415 may include at least one of the following information elements: an identifier of the DSC (DSC_ID according to FIG. 4), an identifier of the at least one slice (Slice_ID according to FIG. 4), and an identifier of the determined operation mode of the DSC (Functional Operation_ID according to FIG. 4).

The processor 901 may generate a configuration signaling message 416 for transfer to the DSC 402, e.g. as described above with respect to FIG. 4. The configuration signaling message 416 may include at least one of the following configuration parameters: an identifier of the at least one slice (Slice_ID according to FIG. 4), an amplification factor (AmpF according to FIG. 4), a HARQ operating point, a HARQ scheme, QoS parameters, e.g. according to FIG. 4.

The configuration parameters included in the configuration signaling message 416 may depend on the functional operation of the DSC 402, e.g. as illustrated in FIG. 4.

The channel measurements may include one or more of the following: channel measurements of a direct link 717 connecting the at least one UE 714 to a macro base station (BS) 701 of the radio communication network (e.g. as illustrated in FIG. 7), channel measurements of an access link 716 connecting the at least one UE 714 to the DSC 705 (e.g. as illustrated in FIG. 7), channel measurements of a backhaul link 715 between the macro BS 701 and the DSC 705 (e.g. as illustrated in FIG. 7). The processor 901 may determine the functional operation 908 of the DSC 705 based on a comparison of the channel measurements of the direct link 717, the access link 716 and the backhaul link 715. The processor 901 may compare the channel measurements of the direct link 717, the access link 716 and the backhaul link 715 based on their channel quality, in particular based on their signal-to-interface-plus-noise ratio (SINR), reference signal receive power (RSRP) or reference signal received quality (RSRQ).

The functional operation 908 of the DSC may include at least one of: Layer 1 (L1) functional capabilities 304, Layer 2 (L2) functional capabilities 302, 303, Layer 3 (L3) functional capabilities 301, e.g. as illustrated in FIG. 3, Amplify and Forward (AF) operation mode 801, Decode and Forward (DF) operation mode 802, e.g. as illustrated in FIG. 8. Note that AF and DF are operation modes, whereas L1/L2/L3 define the functional capabilities of DSC. So, for example DF operation can be performed, e.g., by either L2 or L1 DSCs.

The RAN control unit 900, 210 may include a functionality residing at a macro BS 211 of the radio communication network in case of L1 functional operation, L2 functional operation and/or AF mode, e.g. as illustrated in FIG. 2. The RAN control unit 900, 210 may include a self-organizing network (SON) functionality 231 residing at a network manager 230 of the radio communication network in case of L3 functional operation and/or DF mode, e.g. as illustrated in FIG. 2.

The processor 901 may determine a functional operation 908 of a second DSC 503 based on the channel measurements of the at least one radio channel, the requirement information of the at least one slice and location information of the second DSC 503, e.g. as shown above with respect to FIG. 5. The functional operation of the DSC 502 may be associated with a first component carrier CC1, 630 and/or at least one second component carrier CC2, 640 on which the DSC 502 operates, e.g. as shown in FIG. 6. The processor 901 may determine the functional operation 908 of the DSC additionally based on functional operations of at least one other DSC. This facilitates the RAN control unit to make the adaptation of the functional operation dependent on a functional operation of one or more other DSCs.

Figure 10:
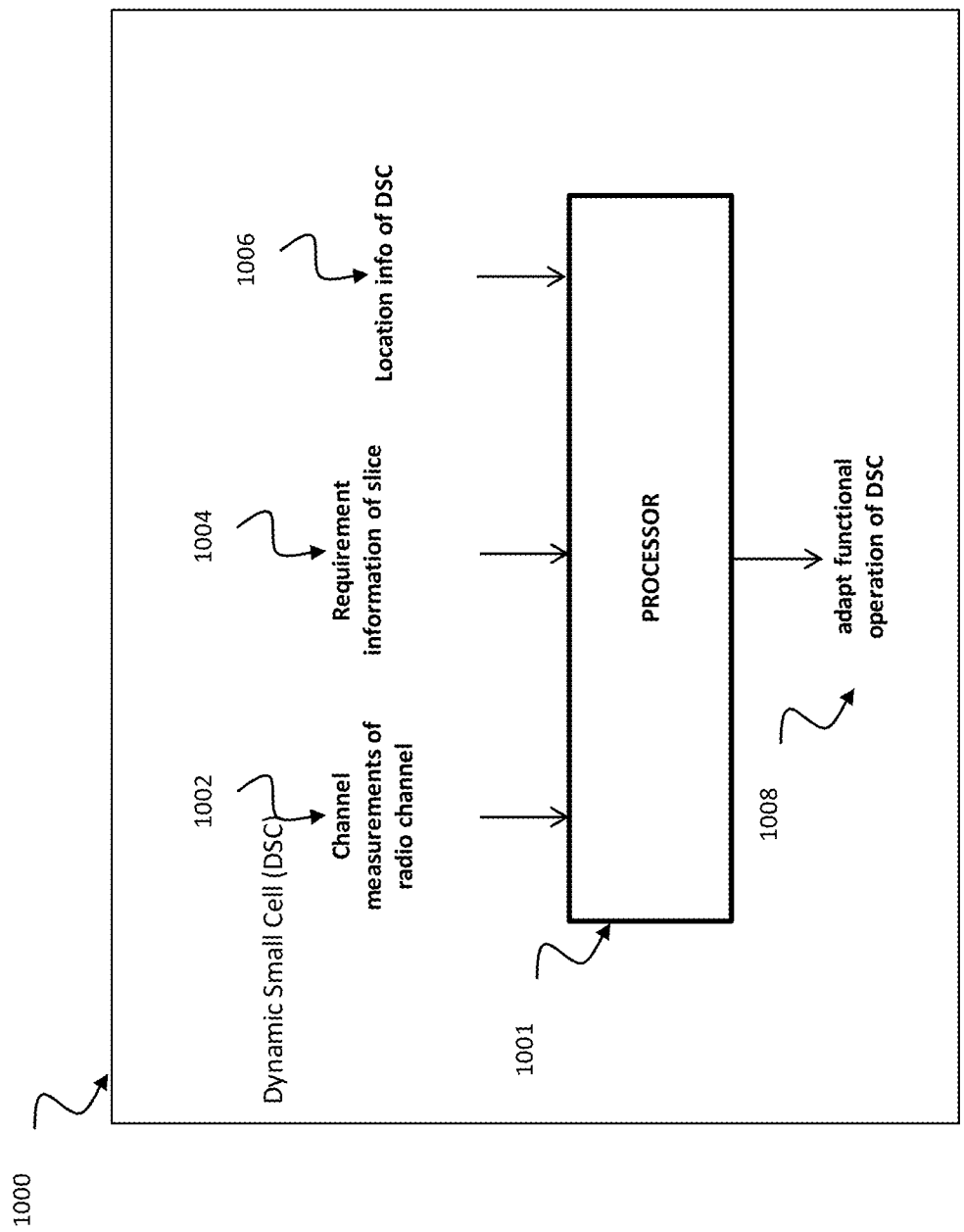
FIG. 10 shows a schematic diagram illustrating a dynamic small cell (DSC) 1000 according to an implementation form.

FIG. 10 shows a schematic diagram illustrating a dynamic small cell (DSC) 1000 according to an implementation form. The dynamic small cell 1000 may particularly be an unplanned small cell, a nomadic node or a relay. The DSC can be located in a radio communication network comprising at least one slice associated with at least one user equipment (UE) and at least one radio channel connecting the at least one UE to the radio communication network. The DSC 1000 includes a processor 1001 that is configured to adapt a functional operation 1008 of the DSC 1000. The functional operation of the DSC 1000 is adapted 1008 based on information based on channel measurements 1002 of the at least one radio channel and/or requirement information 1004 of the at least one slice, and/or estimated or measured performance of a radio access network (RAN), and/or location information 1006 of the DSC 1000 or based on received information of the functional operation of the DSC 1000 from a RAN control unit 900, in particular a RAN control unit 900 described above with respect to FIG. 9. All of these information elements described above can be used for adapting the functional operation 1008 or alternatively only a subset of these information elements can be used.

In one example, the channel measurements 1002, the requirement information 1004 and/or the location information 1006 used by DSC 1000 may correspond to the channel measurements 902, the requirement information 904 and/or the location information 906 used by the RAN control unit 900 described above with respect to FIG. 9. In one example, where the RAN control unit 900 can determine the functional operation and where DSC 1000 can determine its functional operation, all or at least a part of the measurements 902 used by RAN control unit can be different from measurements 1002 used by DSC 1000.

The channel measurements 1002, the requirement information of at least one slice 1004 and the location information 1006 may be determined by a RAN control unit 900 as described above with respect to FIG. 9 or as described above with respect to FIGS. 1 to 8. The processor 1001 may receive the information of the functional operation of the DSC 1000 from a RAN control unit, e.g. the RAN control unit 900 described above with respect to FIG. 9 or one of the RAN control units 101, 210, 220 described above with respect to FIGS. 1 and 2.

The processor 1001 may determine the location information 1006 of the DSC 1000 and may transfer the location information 1006 to the RAN control unit 900.

Adapting the functional operation of the DSC may be additionally based on functional operations of other DSCs. The processor 1001 may send the adapted functional operation 1008 of the DSC 1000 to the network side, in particular to the RAN control unit 900 described above with respect to FIG. 9.

The present disclosure also supports a method for determining a functional operation of a dynamic small cell (DSC), in particular an unplanned small cell, a nomadic node or a relay, in a radio communication network comprising at least one slice associated with at least one user equipment (UE) and at least one radio channel connecting the at least one UE to the radio communication network, the method comprising: determining a functional operation of the DSC based on channel measurements of the at least one radio channel, requirement information of the at least one slice and location information of the DSC, e.g. as described above with respect to FIG. 9.

The disclosure also supports a method for adapting a functional operation of a DSC, the method comprising: receiving channel measurements of the at least one radio channel, requirement information of the at least one slice and location information of the DSC; and adapting the functional operation of the DSC based on the channel measurements of the at least one radio channel, the requirement information of the at least one slice and the location information of the DSC, e.g. as described above with respect to FIG. 9.

The present disclosure also supports a computer program product including computer executable code or computer executable instructions that, when executed, causes at least one computer to execute the performing and computing steps described herein, in particular the steps of the method described above. Such a computer program product may include a readable non-transitory storage medium storing program code thereon for use by a computer. The program code may perform the processing and computing steps described herein, in particular the method described above.

The techniques described in this disclosure can be standard relevant. Various messages and information elements may require changes in the signaling. Besides, these messages may be transferred over, e.g., Uu and/or Un interfaces.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the disclosure beyond those described herein. While the present disclosure has been described with reference to one or more particular embodiments, those skilled in the art recognize that many changes may be made thereto without departing from the scope of the present disclosure. It is therefore to be understood that within the scope of the appended claims and their equivalents, the disclosure may be practiced otherwise than as specifically described herein.

What is claimed is:

1. A radio access network (RAN) control unit in a radio communication network, the radio communication network comprising at least one network slice associated with at least one user equipment (UE) and at least one radio channel connecting the at least one UE to the radio communication network, the RAN control unit comprising:
   a transmitter configured to send a configuration signaling message to a dynamic small cell (DSC), wherein the configuration signaling message comprises at least one of the following configuration parameters: an identifier of the at least one network slice, an amplification factor, a Hybrid Automatic Repeat Request (HARQ) operating point, a HARQ scheme, or quality of service (QoS) parameters.

2. The RAN control unit of claim 1, wherein the configuration parameters comprised in the configuration signaling message depend on a functional operation of the DSC.

3. The RAN control unit of claim 2, wherein the functional operation of the DSC comprises at least one of:
   Layer 1 (L1) functional capabilities;
   Layer 2 (L2) functional capabilities;
   Layer 3 (L3) functional capabilities;
   an Amplify and Forward (AF) operation mode; or
   a Decode and Forward (DF) operation mode.

4. The RAN control unit of claim 3, wherein the functional operation of the DSC comprises:
   a functionality residing at a macro base station of the radio communication network; or
   a self-organizing network functionality residing at a network manager of the radio communication network.

5. The RAN control unit of claim 2, further comprising:
   a processor configured to determine a functional operation of a second DSC based on channel measurements of the at least one radio channel, requirement information of the at least one network slice, and location information of the second DSC.

6. The RAN control unit of claim 2, wherein the functional operation of the DSC is associated with at least one of a first component carrier or a second component carrier on which the DSC operates.

7. The RAN control unit of claim 2, further comprising:
   a processor configured to determine the functional operation of the DSC based on a functional operation of at least one other DSC.

8. A dynamic small cell (DSC) in a radio communication network, the radio communication network comprising at least one network slice associated with at least one user equipment (UE) and at least one radio channel connecting the at least one UE to the radio communication network, the DSC comprising:
   a receiver configured to receive, from a radio access network (RAN) control unit, a configuration signaling message, wherein the configuration signaling message comprises at least one of the following configuration parameters: an identifier of the at least one network slice, an amplification factor, a Hybrid Automatic Repeat Request (HARQ) operating point, a HARQ scheme, or quality of service (QoS) parameters.

9. A method, comprising:
   sending, by a radio access network (RAN) control unit in a radio communication network, a configuration signaling message to a dynamic small cell (DSC), wherein the radio communication network comprises at least one network slice associated with at least one user equipment (UE) and at least one radio channel connecting the at least one UE to the radio communication network,
   wherein the configuration signaling message comprises at least one of the following configuration parameters: an identifier of the at least one network slice, an amplification factor, a Hybrid Automatic Repeat Request (HARQ) operating point, a HARQ scheme, or quality of service (QoS) parameters.

10. The method of claim 9, wherein the configuration parameters comprised in the configuration signaling message depend on a functional operation of the DSC.

11. The method of claim 10, wherein the functional operation of the DSC comprises at least one of:
    Layer 1 (L1) functional capabilities;
    Layer 2 (L2) functional capabilities;
    Layer 3 (L3) functional capabilities;
    an Amplify and Forward (AF) operation mode; or
    a Decode and Forward (DF) operation mode.

12. The method of claim 11, wherein the functional operation of the DSC comprises:
    a functionality residing at a macro base station of the radio communication network; or
    a self-organizing network functionality residing at a network manager of the radio communication network.

13. The method of claim 10, further comprising:
    determining a functional operation of a second DSC based on channel measurements of the at least one radio channel, requirement information of the at least one network slice, and location information of the second DSC.

14. The method of claim 10, wherein the functional operation of the DSC is associated with at least one of a first component carrier or a second component carrier on which the DSC operates.

15. The method of claim 10, further comprising determining the function operation of the DSC based on a functional operations of at least one other DSC.

16. The DSC of claim 8, further comprising:
    a transmitter configured to send an acknowledgement of the DSC to the RAN control unit indicating that a configuration setup is complete.

* * * * *